April 18, 1939.  W. H. MARSH ET AL  2,155,321
ROTARY METER
Filed May 6, 1936   2 Sheets-Sheet 1

INVENTORS.
FRANK J. BROOKS
WALTER H. MARSH
BY
Strauch & Hoffman
ATTORNEYS

April 18, 1939. W. H. MARSH ET AL 2,155,321
ROTARY METER
Filed May 6, 1936  2 Sheets-Sheet 2

INVENTORS.
FRANK S. BROOKS
WALTER H. MARSH
BY
Strauch & Hoffman
ATTORNEYS

Patented Apr. 18, 1939

2,155,321

UNITED STATES PATENT OFFICE 2,155,321

ROTARY METER

Walter H. Marsh, Crafton, and Frank S. Brooks, Edgewood, Pa., assignors to Pittsburgh Equitable Meter Company, Pittsburgh, Pa., a corporation of Pennsylvania Application May 6, 1936, Serial No. 78,272

12 Claims. (Cl. 73—259)

This invention relates to fluid meters and more particularly to liqud meters of the rotary type.

In the application of Horace Chrisman and Nelson J. Seibert, Serial No. 759,774, filed December 29, 1934, there is disclosed a rotary meter having a rotor that carries a plurality of radially slidable vanes or blades on rollers operating in a chamber of general cylindrical shape, and a cam moves the vanes radially to successively form measuring chambers which are then opened into the outlet of the meter.

According to the present invention, a rotary meter is provided in which the radially movable vanes are mounted or suspended at the top of the meter at two points, and provision is made to prevent tilting of the vanes. In the preferred embodiment the vanes are mounted on rollers and a plate having suitable tracks thereon is adjusted to such position over the rollers as to provide upper tracks which definitely prevent the vanes from being tilted. Preferably, the rollers are mounted on ball bearings. Provision is also made to prevent sediment or other foreign material which accumulates in the meter from obstructing the tracks of the rollers or otherwise interfering with the operation of the meter. In the preferred embodiment the rotor has its top surface inclined and perforated so that sediment that falls thereon will be carried outward by centrifugal force and down into a bottom sump provided in the rotor chamber, and the tracks upon which the rollers operate are elevated from the top surface of the rotor.

It is therefore an object of this invention to provide a novel rotary meter in which frictional resistance to turning is reduced to an unobjectionable minimum.

Another object is the provision of a rotary meter having radially movable vanes, wherein the vanes are mounted on anti-friction devices and means is provided for preventing the blades from becoming jammed, or otherwise interfering with the operation of the meter by becoming tilted in operation.

A further object is the provision of a meter having novel means for accumulating sediment in a portion of the chamber thereof where it will not interfere with the operation of the blade suspension or meter.

Still another object is the provision of a novel mounting for the rotor and blades in the meter whereby the bottom bearing is protected against entrance of sediment or other foreign matter.

Another object is the provision of a relatively rigid rotor which is of light weight and easy to assemble.

These and other objects will be apparent from a consideration of the following specification taken in connection with the accompanying drawings and wherein:

Figure 4 is a fragmentary section on the line IV—IV of Figure 2, and

Figure 5 is a fragmentary bottom elevation of the rotor.

Figure 1:
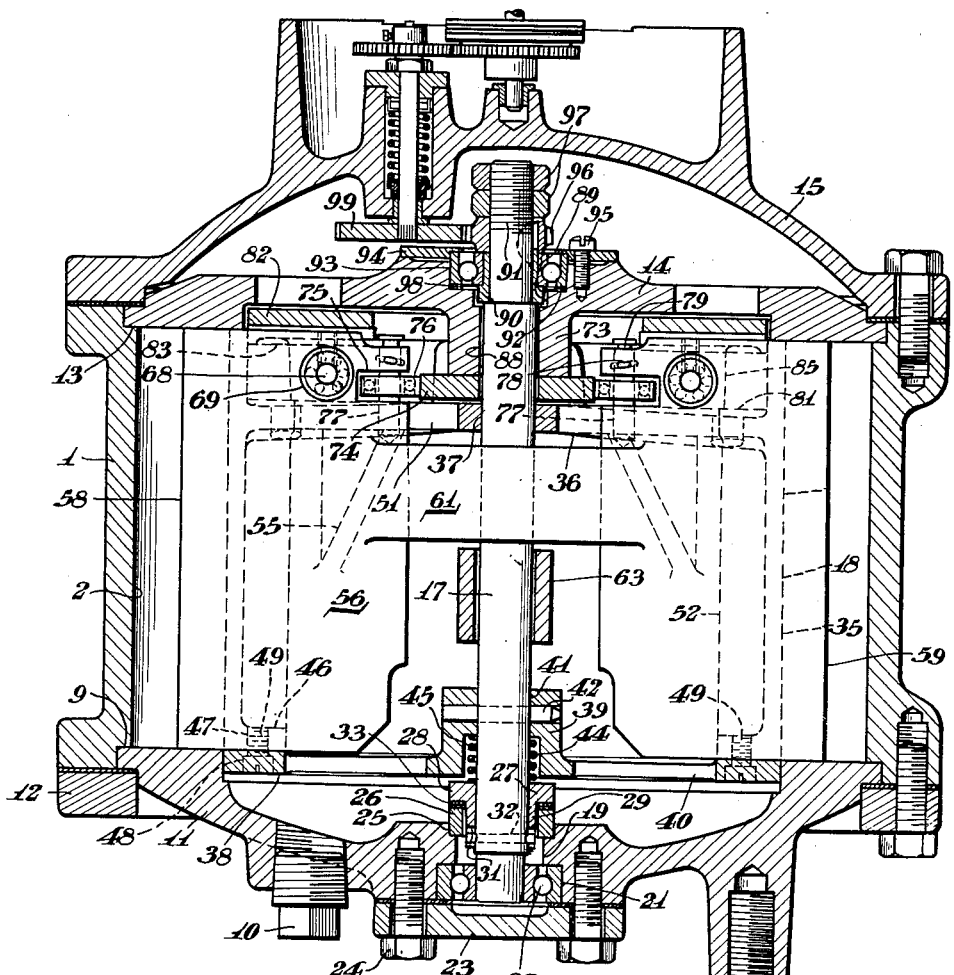
Figure 1 is a view in vertical section of a preferred embodiment of the invention taken on line I—I of Figure 2.
Figure 2:
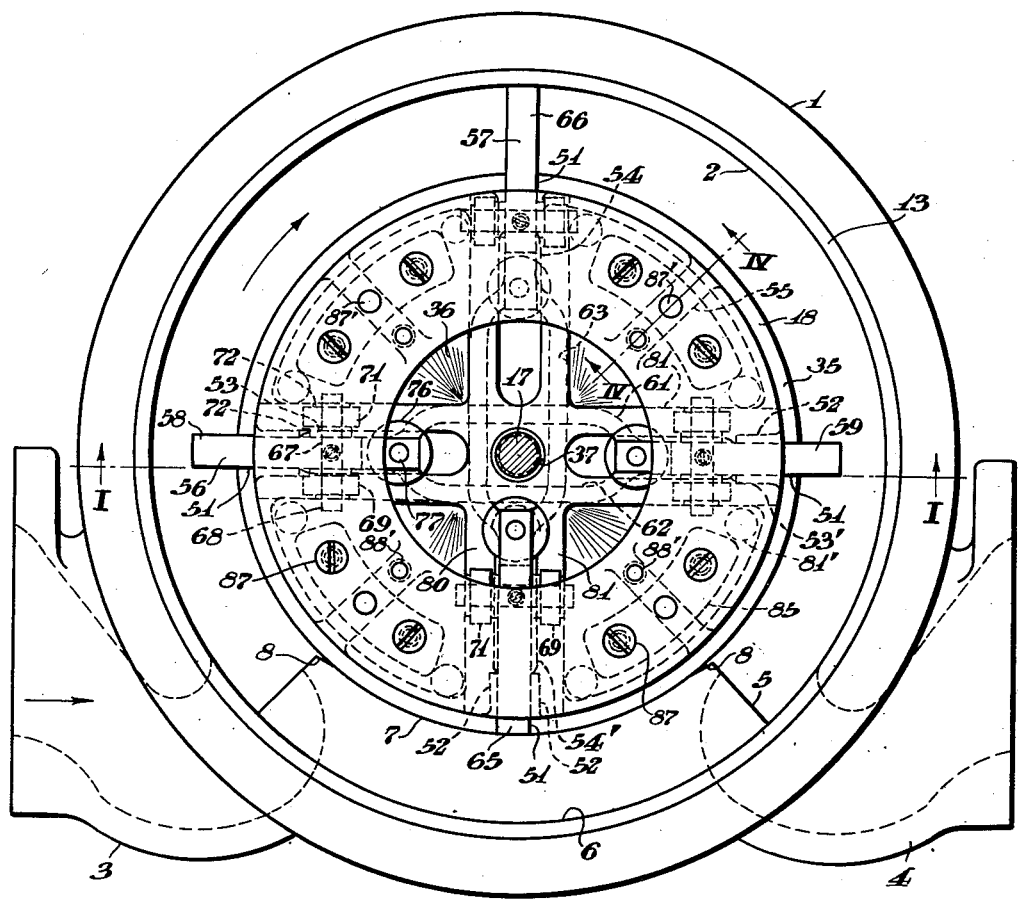
Figure 2 is a plan view of the meter with the cover and bearing plate removed.
Figure 3:
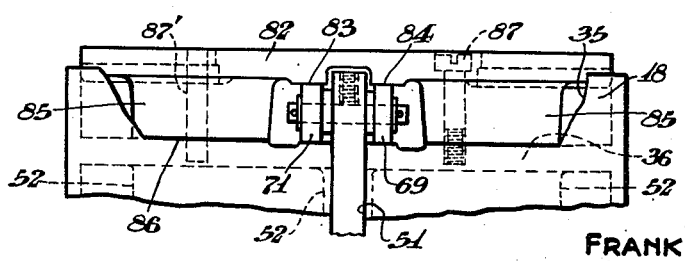
Figure 3 is a side view of the rotor with parts broken away showing the vane mounting and cooperating tracks.

Referring to the drawings, the meter comprises a flanged outer casing 1 having a cylindrical chamber 2 formed therein and inlet and outlet connections 3 and 4 (Figure 2) respectively communicating with said chamber. A division plate 5 is suitably secured within the chamber 2 between the inlet and outlet openings in any suitable manner, one face 6 being substantially coincident with the cylindrical wall 2, and the other face 7 being substantially concentric therewith, the ends of the face 7 being chamfered as indicated at 8. The bottom of the casing 1 (Figure 1) is counterbored to provide a shoulder 9 and is closed by a bottom plate 11 resting on the shoulder and held in position by a retaining ring 12 bolted thereto. It will be understood that the bottom cover may be secured to the casing in any other suitable manner. A sump is provided in the bottom cover and is normally closed by screw plug 10. The casing 1 at its top has a similar internal shoulder 13 upon which is seated a top bearing plate 14 which preferably is held in place by a top cover 15 bolted or otherwise secured to the casing 1.

A central shaft 17 is journalled in the bottom cover 11 and top plate 14 and carries a rotor 18. The bottom cover 11 is bored at 19 to allow the shaft to pass therethrough, and is counterbored at 21 to receive the inner and outer races respectively of a radial ball bearing assembly indicated generally by the numeral 22, the inner race being suitably secured to the shaft 17 in known manner as by a pressed fit. The ball bearing assembly 22 is protected from the exterior by a cover plate 23 bolted to the bottom cover by bolts 24, or secured thereto in any other suitable manner. The bottom cover 11 is counterbored at its interior as indicated at 25 to provide a step which receives a seat ring 26. A bushing 27 is slidable on the shaft 17 and has a flange 28 at its top and a cylindrical extension 29 which is slotted at its end as indicated at 31 and receives a cross pin 32 passing through a suitable transverse hole in the shaft 17. The cylindrical portion 29 of bushing 27 provides a running clearance with the seat ring 26, and one or more washers 33 are interposed between the flange 28 of the bushing and the top surface of the seat ring 26 to exclude dirt and protect the bearing 22. These washers may be made of any suitable oil resistant material preferably having a low coefficient of friction, such as "Micarta", phosphorbronze, "Bakelite", or the like. By this construction it will be evident that the shaft 17 is mounted in an anti-friction bottom bearing which is protected by the washers 33 against the entrance of sediment or other foreign material from the interior of the meter, and the cover plate 23 protects this bearing against injury from the exterior.

The rotor 18 comprises an outer substantially cylindrical wall 35 and a head 36 preferably integral therewith which is bored at 37 to receive the shaft 17 extending therethrough. The bottom plate 38 having openings 40 therethrough is secured to the rotor and has a central hub 39 which is bored at 41 to receive the shaft 17. The bottom plate 38 is keyed to shaft 17 by a pin 42 passing through a suitable hole therethrough. The hub 39 of the bottom plate is counterbored at 44 to receive a coil spring 45, one end of the spring bearing against the top of the bushing 27, and the other end reacting against the top of the counterbore 44. The lower end of the cylindrical wall 35 of the rotor 18 is thickened by an internal flange indicated at 46, and has a plurality of dowel holes therein and threaded bores 47. The outer periphery of bottom plate 38 is thickened and has a plurality of counterbored holes 48 therein which receive the machine screws 49 threaded into the bores 47 in the rotor on both sides of the slots 51, and these together with dowels 50 passing through the bottom plate into the rotor flange 46 on both sides of the slots 51 maintain the bottom plate in assembled position with the rotor. This construction prevents the bottom of the rotor from spreading.

The cylindrical wall 35 has a plurality of slots 51 bordered with internal flanges 52 formed therein and which slots are extended radially and enlarged through the rotor head 36 as indicated at 53, 53' and 54, 54', and which terminate short of the central bore 37 to provide a suitable thickness of metal, a plurality of webs 55 being formed integral with the head 36 and rotor wall 35 to prevent deformation of the rotor. A vane or blade 56 and a vane or blade 57 transverse of the vane 56 are received in the slots 51 of the rotor. The vane 56 comprises two flat end blades 58 and 59 interconnected by an integral yoke 61 having a slot 62 therein of sufficient width to freely receive the shaft 17. The vanes 56 and 57 extend through the slots in the rotor head and through the cylindrical wall 35 of the rotor into the cylindrical chamber 2. As the vanes 56 and 57 differ only in that the yokes 61 and 63 connecting the two end blades 65 and 66 of vane 57 is offset from the yoke 61, only vane 56 will be described in detail. The blade 58 of vane 56 is bored horizontally at 67 to receive a pin 68 held in place by a suitable set screw, and a pair of rollers 69 and 71 are journaled on the outer ends of pin 68 on ball bearings and are held in place by suitable spacing washers 72 and cotter pins (not shown) or any other suitable means. The top plate 14 has a depending hub 73 integral therewith to which the cam 74 is secured in any suitable manner. The blade 58 has a laterally cut out portion 75 to receive a roller 76 which is freely journaled on ball bearings about vertical pin 77, the pin being held in place by a bent over cotter pin 78. Circumferential groove 79 formed in the periphery of pin 77 at its upper end facilitates removal thereof. The rotor head 36 is machined to provide a pair of horizontal tracks 81 and 80 adjacent each of the radial relieved slots 53, 53', 54 and 54', and the rollers 69 and 71 rest on these tracks respectively and support the vanes. The head 36 between the tracks is high at its center and is inclined as the tracks and rotor wall 18 are approached, drain holes 81' being formed therethrough.

At its top the rotor 18 receives an annular plate 82 having on its bottom a plurality of pairs of elevated parallel tracks 83 and 84. The plate 82 is located with the tracks 83 and 84 opposite the tracks 80 and 81 and forming a running clearance with the rollers 69 and 71, the clearance being accurately adjusted by accurately machining the lugs 85 on the annular top plate to the required height. If desired the exact adjustment of the tracks to the rollers may be accomplished by the use of shims placed between the lugs 85 and a complementary machined surface 86 on the head 36. The plate 82 is held in assembled position by a plurality of dowels 87' extending through the plate 82 into the rotor head, and screws 87 passing through the lugs 85 and threaded into the rotor head. The plate 82 has four threaded holes 88' therein. To remove plate 82 the screws 87 are removed and threaded into holes 88' in which they serve to jack loose the plate 82.

The top bearing plate 14 and lug 73 are bored at 88 to allow the shaft 17 to pass therethrough, and the bearing plate is counterbored at 89 to receive a bushing 90 pressed on to the reduced threaded end 91 of the shaft 17. The bushing 90 receives the inner race of a combined radial and end thrust ball bearing assembly 92, the outer race thereof being received in a suitable counterbore 93 in the top bearing plate 14. The outer race of the ball bearing assembly 92 is bored to the outer diameter of the circle of balls and terminates at the bottom in a spherical shoulder while the inner race has a circumferential groove spherical in cross section forming in effect upper and lower spherical shoulders. Thus the balls bear against the spherical shoulder of the outer race and the upper spherical shoulder of the inner race to resist axial downward thrust, and bear against the side walls of the races to resist radial thrust. An annular plate 94 secured to the top plate by screws 95 or other suitable means keeps the ball bearing assembly 92 in position. A pinion 96 is slipped over the reduced end 91 of the shaft with a tight fit and is keyed thereto, and is held in assembled relation by the lock nuts 97 which also maintain the ball bearing assembly 92 against the bottom flange of bushing 90. It will be seen that the rotor 18 is suspended from the top bearing 92, and by means of shims 98 the rotor may be accurately adjusted to allow a running clearance for the vanes 56 and 57 and rotor 18 with bottom plate 11. The pinion 96 drives a gear 99 which in turn drives a compensating mechanism much as that disclosed in the application of Walter Marsh, filed July 31, 1935, Serial No. 34,046, which forms no part of the present invention.

In operation liquid enters the measuring chamber 2 through the inlet 3 and is directed substantially tangentially against the blades 56 and 57. The pressure and velocity of the incoming liquid drives the blades around the chamber 2 which causes rotation of the rotor 18. The cam 74 reacting on the rollers 76 is of such shape that one set of the blades forms two chambers with the division plate 5, one of which receives liquid from the inlet 3 while the other is discharging at the outlet 4. The rotary movement of the rotor 18 is transmitted by pin 42 to the shaft 17 and by gear 96 to gear 99 which drives the counter mechanism. The vanes rest entirely on the pairs of rollers 69 and 71 and contact with the cam 74 through rollers 76, thereby greatly reducing friction. The tracks 83 and 84 on the top plate 82, and the tracks 80 and 81 on the rotor head 36 are so spaced as to provide merely a small running clearance with the rollers 69 and 71 and thereby prevent any substantial axial movement of the vanes or tilting of the center axis of the vanes 56 and 57 as they shuttle back and forth. The weight of the rotor, vanes and shaft is carried by the upper ball bearing assembly 92, the bottom ball bearing assembly 22 serving merely as a radial bearing. Any foreign material that finds its way into the meter above the rotor is washed down the inclined head through openings 81', and through the openings 40 in the bottom plate 38 of the rotor into the sump provided in the bottom cover 11, and can be drained therefrom by removing the threaded plug 10. The spring 45 maintains the bushing 27 at all times in contact with the "Micarta" washers 33 and is made as weak as practicable to keep these washers in sealing contact with the seat ring 26, and to avoid undue friction. The "Micarta" washers 33 provide a seal against entrance of foreign matter to the bearing.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid meter, a rotor having a plurality of radial slots therein, a plurality of vanes movable in said slots and confined by said slots against tilting in a plane normal to said slots, a plurality of tracks on said rotor adjacent said slots, friction reducing means on said vanes operating on said tracks and secured to said vanes, said friction reducing means supporting the weight of said vanes, and a member secured to said rotor and having tracks thereon spaced from the tracks on said rotor, said tracks being arranged in opposed relation to engage said friction reducing means and thereby limit tilting of said vanes in a plane parallel to said slots.

2. In a fluid meter, a rotor rotatable about an axis and having a plurality of slots therein, a plurality of vanes movable in said slots, a plurality of tracks on said rotor adjacent said slots, rollers journalled on said vanes on axes transverse to the rotor axis and operating on said tracks and supporting said vanes, and a plate secured to said rotor having tracks thereon spaced from the tracks on the rotor and confining the movement of the rollers therebetween.

3. In a fluid meter, a casing providing a measuring chamber, a substantially hollow cylindrical rotor in said measuring chamber rotatable about an axis, said rotor having an integral head and having a plurality of spaced slots in the cylindrical wall of said rotor extending into said head, a plurality of tracks formed on said head adjacent said slots therein, a plurality of vanes movable in said slots, rollers journalled on said vanes on axes transverse to the rotor axis and operating on said tracks and supporting said vanes, and a plate secured to said rotor having tracks thereon bearing on said rollers to prevent said rollers from substantially moving axially of the rotor between the tracks.

4. In a fluid meter, a rotor rotatable about an axis and having a plurality of slots therein, a plurality of vanes movable in said slots, a plurality of tracks on said rotor adjacent said slots, rollers journaled on ball bearings on said vanes on axes transverse to the rotor axis and operating on said tracks and supporting said vanes, and a plate secured to said rotor having tracks thereon spaced from the tracks on the rotor and confining the movement of the rollers therebetween.

5. In a fluid flow mechanism, a casing having inlet and outlet ports, a rotor mounted for rotation within the casing on an axis and defining a flow channel with the casing extending between the ports, rotor vanes extending through said rotor for shuttle movement transversely of the flow channel and confined by said rotor against tilting in one plane, and means, carried by said vanes and said rotor, comprising anti-friction members and cooperating spaced tracks arranged on opposite sides of said anti-friction members for confining said vanes against tilting in another plane at right angles to said first named plane.

6. In a fluid flow mechanism, a casing having inlet and outlet ports, a rotor body mounted for rotation within the casing and defining a flow channel with the casing extending between the ports, rotor vanes extending through said rotor for shuttle movement transversely of said flow channel and confined by said rotor against tilting in one plane, and means comprising rollers journalled on said vanes and cooperating spaced tracks on said rotor for engaging opposite sides of said rollers and confining said vanes against substantial tilting in another plane at right angles to said first named plane.

7. In a fluid flow mechanism, a casing having inlet and outlet ports, a rotor body mounted for rotation within the casing and defining a flow channel with the casing extending between the ports, rotor vanes extending through said rotor for shuttle movement transversely of said flow channel and each of said vanes being confined by said rotor against tilting in one plane, means comprising anti-friction rollers on said vanes and cooperating upper and lower tracks on said rotor engaging said rollers on opposite sides thereof for confining said vanes against substantial tilting in another plane at right angles to said first named plane, said rollers supporting said vanes on said rotor, and means for axially adjusting said rotor relative to said casing to adjust the spacing of said vanes from the sides of said flow channel.

8. In a fluid meter, a casing having a measuring chamber, a top cover for said chamber, a vertical shaft rotatably journalled in and suspended from said top cover, a rotor secured to and supported by said shaft, radially movable vanes carried on said rotor, spaced tracks on said rotor, and rollers journaled on said vanes on axes at right angles to the plane of said vanes, said rollers being received between said spaced tracks to support and prevent tilting of said vanes in a plane normal to said axes.

9. In a fluid meter, a casing having a measuring chamber, a bearing plate for said measuring chamber, a combined radial and end thrust anti-friction bearing mounted on said bearing plate, a shaft journalled in said bearing and suspended substantially entirely therefrom, a rotary impeller in said measuring chamber supported by said shaft, rotor vanes extending through said rotor for shuttle movement transversely of said chamber and confined by said rotor against tilting in one plane, and means comprising anti-friction members on said vanes and cooperating spaced tracks on said rotor arranged on opposite sides of said anti-friction members for supporting and confining said vanes against substantial tilting in another plane at right angles to said first named plane.

10. In a fluid meter, a casing providing a measuring chamber, a top bearing plate for said chamber, a bottom cover for said chamber having a sump therein, a bearing mounted in said bottom cover below said sump, a bearing mounted in said top plate, a shaft suspended from said last named bearing and journalled in said other bearing, a rotor carried by said shaft and having means for discharging sediment into said sump, and sealing means associated with said shaft and bottom cover above said first named bearing for preventing sediment from entering said bearing.

11. In a fluid meter, the combination set forth in claim 10, wherein said sealing means comprises an annular seat on said bottom cover above said last named bearing, a flanged sleeve carried by said shaft and resiliently biased towards said seat, and sealing washers interposed between said seat and said flanged sleeve.

12. In a fluid meter, a casing providing a measuring chamber, a rotor member having a head and being divided by a plurality of radially extending slots and having spaced tracks on said head adjacent said slots, a plurality of vanes fitting said slots having anti-friction members thereon operating on said tracks whereby said vanes are supported by the rotor for substantially radial movement, the top surface of the head of said rotor member being inclined downwardly toward the periphery and toward said tracks and having holes formed therethrough adjacent the lowermost points of said surface, a top bearing plate for said casing, a shaft journalled in said bearing plate and carrying said rotor member, a bottom cover for said casing, and a bearing in the bottom cover having the lower end of said shaft journalled therein.

WALTER H. MARSH.
FRANK S. BROOKS.